(12) United States Patent
Waas

(10) Patent No.: US 9,218,209 B2
(45) Date of Patent: Dec. 22, 2015

(54) APPARATUS AND METHOD FOR PARALLEL PROCESSING OF A QUERY

(75) Inventor: Florian Michael Waas, Seattle, WA (US)

(73) Assignee: Pivotal Software, Inc., Palo Alto, CA (US)

( * ) Notice: Subject to any disclaimer, the term of this patent is extended or adjusted under 35 U.S.C. 154(b) by 1540 days.

(21) Appl. No.: 12/347,728

(22) Filed: Dec. 31, 2008

(65) Prior Publication Data

US 2010/0169887 A1    Jul. 1, 2010

(51) Int. Cl.
*G06F 9/46* (2006.01)
*G06F 9/50* (2006.01)

(52) U.S. Cl.
CPC ...... *G06F 9/5027* (2013.01); *G06F 2209/5018* (2013.01)

(58) Field of Classification Search
None
See application file for complete search history.

(56) References Cited

PUBLICATIONS

Han W.S. et al., Parallelizing Query Optimization, PVLDP '08, Aug. 23-28, 2008, pp. 188-200.

*Primary Examiner* — William B Partridge
(74) *Attorney, Agent, or Firm* — Fish & Richardson P.C.

(57) ABSTRACT

A computer readable storage medium comprises executable instructions to receive a query. A graph is built to represent jobs associated with the query. The jobs are assigned to parallel threads according to the graph.

19 Claims, 8 Drawing Sheets

APPARATUS AND METHOD FOR PARALLEL PROCESSING OF A QUERY

FIELD OF THE INVENTION

This invention relates generally to query processing. More particularly, this invention relates to techniques for optimizing a query across multiple cores in a multi-core architecture.

BACKGROUND OF THE INVENTION

Query optimization involves the translation of a database query into an efficient program or query plan to be executed over the data stored in the database. The database query is typically stated in a query language, such as SQL (Structured Query Language), CQL (Contextual Query Language), and MDX (Multidimensional Expressions), among others, and converted into one or more possible query plans. A query plan specifies a set of steps that are used to modify or access the data for executing the query. Details such as how to access a given data relation, in which order to join data relations, sort orders, and so on, may form part of a query plan.

For a given query, a large number of query plans may be generated by varying different constituents of the query plan, such as access paths, join methods, join predicates, and sort orders. The cost of a query plan can be modeled in terms of various parameters, including, for example, the number of disk accesses and the response time required to fetch data. A query optimizer may evaluate the costs of all possible query plans for a given query and determines the optimal, i.e., most efficient plan for executing the query.

A single query may require a large number of optimization jobs—typically in the hundreds of thousands for queries of medium complexity. Each job corresponds to the optimization of a sub-problem of the original query optimization problem. A scheduler in the query optimizer is responsible for scheduling the execution of the multiple jobs corresponding to a given query.

Query optimization jobs may have strong interdependencies, i.e., certain jobs are only applicable after other jobs have been executed. Since the dependencies are the result of ongoing optimization, they are not static and cannot be determined upfront. Dependencies between jobs result from the fact that a given parent job may entail additional dependent jobs. For the parent job to finish, all of its dependent jobs have to be completed. The dependent jobs can themselves become parent jobs and entail further dependents in turn. A parent-dependent relationship is therefore a 1:N relationship there—is no limit on how many dependent jobs a given parent can produce.

The number and type of the dependent jobs for a given parent is generally determined at run time and it is a function of the particular query being executed. The decision to spawn dependent jobs is made by the parent job based on external data structures. Because jobs are self-contained, when re-executed after their dependents are complete they can infer that all their dependent jobs have completed.

Query optimization has been one of the most active fields in database research, with a plethora of optimization techniques developed over the course of the past three decades. One of the most popular query optimizers is provided by the Cascades framework described in G. Graef. "The Cascades Framework for Query Optimization", IEEE Data Engineering Bulletin, 18(3), pp. 19-29, 1995.

The Cascades query optimization framework encodes dependencies using a stack-based scheduler. All pending jobs are kept in a stack and the top-most job is the next to be executed if and only if no other job is currently being executed, i.e., this assertion is only valid between execution of jobs. Consider for example, the stack illustrated in FIG. 1 showing five optimization jobs, labeled from j1 to j5. After a number of executions, the stack looks as depicted in stack 105 with j1-j3 waiting to be executed and no job running. Since j3 is at the top of the stack, it is the next job to be executed. The stack-based scheduler then removes j3 from stack 105 and assigns it to a thread for execution. The stack is then changed into stack 110.

Throughout stacks 110-120, job j3 is running. Since j3 entails additional jobs, it puts itself back onto the stack 115 and adds dependent jobs j4 and j5 to stack 120. Job j3 then returns control to the scheduler, which starts executing j5. Once j5 and j4 are complete, j3 is again the top-most job in stack 125 and can now proceed without spawning additional dependents. Once j3 is complete, control is returned to the scheduler for starting job j2 in stack 130 and so on. The optimization is complete when the stack becomes empty and all jobs have executed.

As illustrated in FIG. 1, the stack-based scheduler used in the Cascades framework cannot be used for scheduling jobs to more than one thread at a time as the stack reflects dependencies correctly only between the executions of jobs. That is, in the example provided in FIG. 1, the stack is not in a well-formed state in stacks 110 and 115. Executing job j2 in stack 110 would break the query optimization process since in stack 115 job j3 puts itself back on the stack for the purpose of spawning its dependent jobs j4 and j5.

The problem with single thread execution is that this query optimization framework is not suitable for the more recently developed multi-core architectures, which combine multiple computing cores (e.g., CPUs or Central Processing Units) into a single processor or integrated circuit. Because query optimization is known to be computationally very intensive, higher CPU performance immediately translates into better and faster optimization results. The performance impacts can easily reach an order of magnitude in running time or more.

Continuous increases in CPU performance dictated by Moore's Law have previously translated into query optimization becoming better automatically as more optimization jobs can be executed within the same amount of time. Due to the current physical restrictions on miniaturization and clock speed in CPUs, future increases in CPU performance come from these multi-core architectures, e.g., dual-core, quad-core, etc., instead of faster single-core CPUs.

Accordingly, it would be desirable to provide query processing techniques that take advantage of the performance increases provided by multi-core architectures. In particular, it would be highly desirable to provide techniques to parallel process a query across multiple parallel threads in a multi-core architecture.

SUMMARY OF THE INVENTION

The invention includes a computer readable storage medium with executable instructions to receive a query. A graph is built to represent jobs associated with the query. The jobs are assigned to parallel threads according to the graph.

The invention also includes a compute readable storage medium with executable instructions to receive a query. A dependency graph is built to encode dependencies between jobs associated with the query. The jobs are scheduled for execution in parallel threads according to the dependencies encoded in the dependency graph.

The invention further includes a method for processing a query. A graph is built to represent jobs associated with a query. A job is assigned to a thread for execution. Dependent jobs of the assigned job are executed in parallel threads. The assigned job is rescheduled for execution until the dependent jobs are complete.

BRIEF DESCRIPTION OF THE DRAWINGS

The invention is more fully appreciated in connection with the following detailed description taken in conjunction with the accompanying drawings, in which like reference characters refer to like parts throughout, and in which.

DETAILED DESCRIPTION OF THE INVENTION

The present invention provides a system, method, software arrangement, and computer readable storage medium for parallel processing a query across multiple cores in a multi-core architecture. Each query is associated with a number of query optimization jobs. Query optimization jobs or simply jobs, as generally used herein, refer to the optimization of a sub-problem of the original query optimization problem. For example, a job may correspond to a step or stage of a given query plan.

According to an embodiment of the invention, a dependency graph is built to encode interdependencies between multiple jobs. The dependency graph, as generally used herein, is a concurrent data structure that can be accessed by any number of parallel threads in a multi-core architecture. The jobs are scheduled for execution in parallel threads according to the dependencies encoded in the dependency graph. In one embodiment, a scheduler assigns the jobs for execution according to a state machine.

Figure 2:
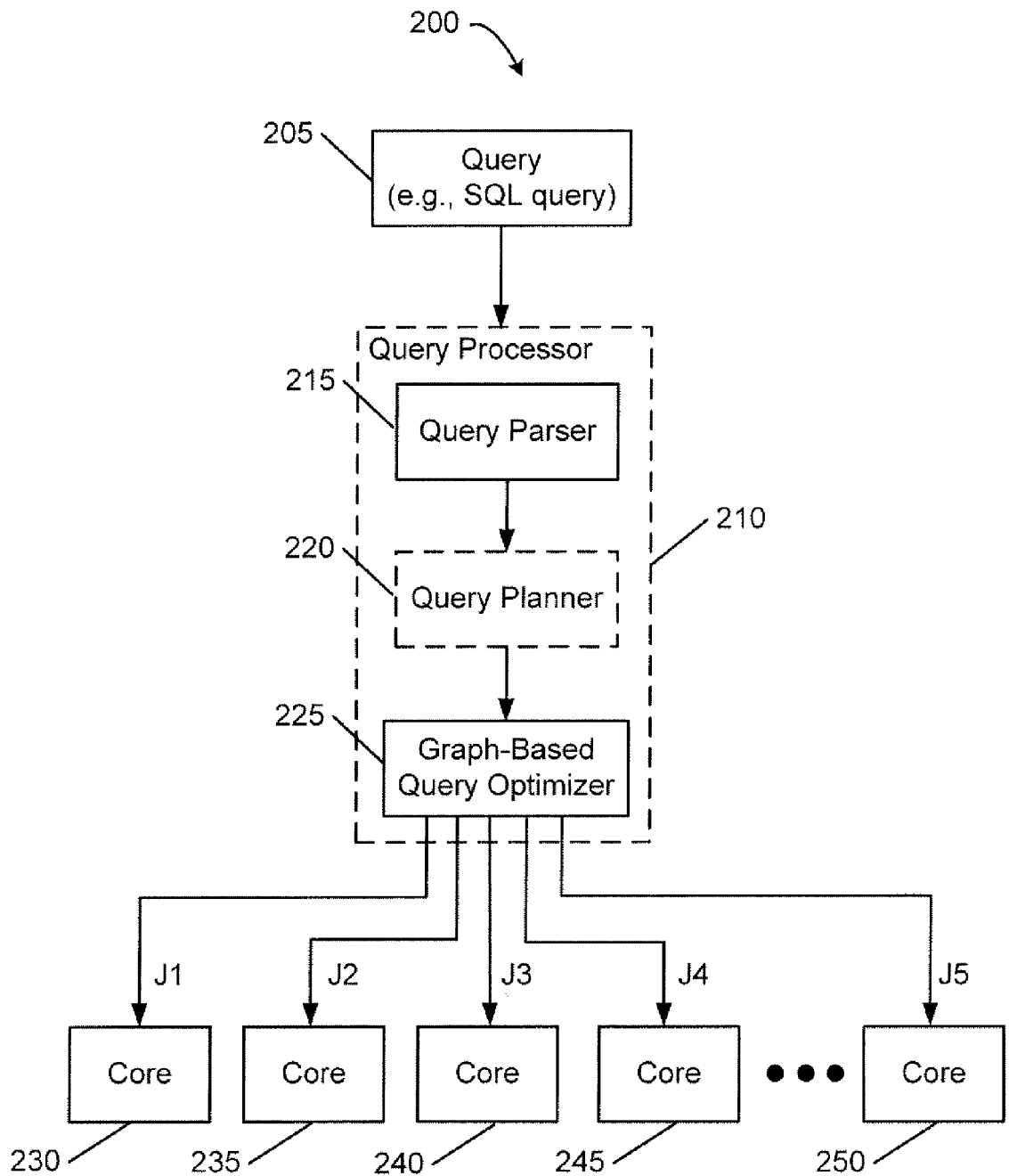
FIG. 2 illustrates an architecture in which embodiments of the invention may operate.

FIG. 2 illustrates an architecture in which embodiments of the invention may operate. Architecture 200 illustrates different components for optimizing the execution of a query 205, which may be SQL, CQL, MDX, or other-type of query. A query processor 210 processes query 205 for execution by parsing the query 205 in a Query Parser 215 and selecting an optimal and efficient query plan for execution in a Graph-Based Query Optimizer 225. Query processor 210 may also have an optional Query Planner 220 for generating multiple possible query plans for the query 205. As understood by one of ordinary skill in the art, Query Planner 220 and Graph-Based Query Optimizer 225 may be integrated together in a single Query Optimizer component. As also understood by one of ordinary skill in the art, Query Planner 220 is optional and may be eliminated entirely.

According to an embodiment of the invention, Graph-Based Query Optimizer 225 parallelizes the optimization of query 205 by sending jobs to parallel threads in a multi-core architecture. As described in more detail herein below, Graph-Based Query Optimizer 225 assigns jobs for execution in parallel threads of multiple cores, such as cores 230-250.

Figure 3:
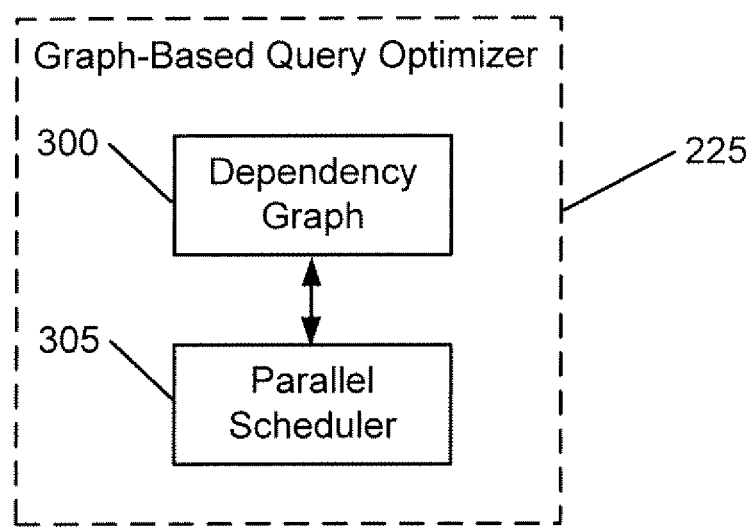
FIG. 3 illustrates a graph-based query optimizer in accordance with an embodiment of the invention.

A more detailed view of Graph-Based Query Optimizer 225 is illustrated in FIG. 3. Graph-Based Query Optimizer 225, in accordance with an embodiment of the invention, includes a Dependency Graph 300 and a Parallel Scheduler 305. Dependency Graph 300, as generally used herein, is a concurrent data structure in the form of a graph for representing jobs during the query optimization process. Each job that is not yet finalized is represented in Dependency Graph 300 as a node. Dependencies between jobs are represented with directed arcs between the jobs.

As a concurrent data structure, Dependency Graph 300 may be accessed by any number of parallel threads. Jobs represented in Dependency Graph 300 are scheduled for execution in parallel threads by Parallel Scheduler 305 according to the dependencies encoded in the graph. It is appreciated that Dependency Graph 300 is a dynamic graph that is updated as jobs get scheduled and executed. As described in more detail herein below, the dynamic nature of the graph enables the fully utilization of multi-core architectures while minimizing lock contention among multiple parallel threads.

Figure 1:
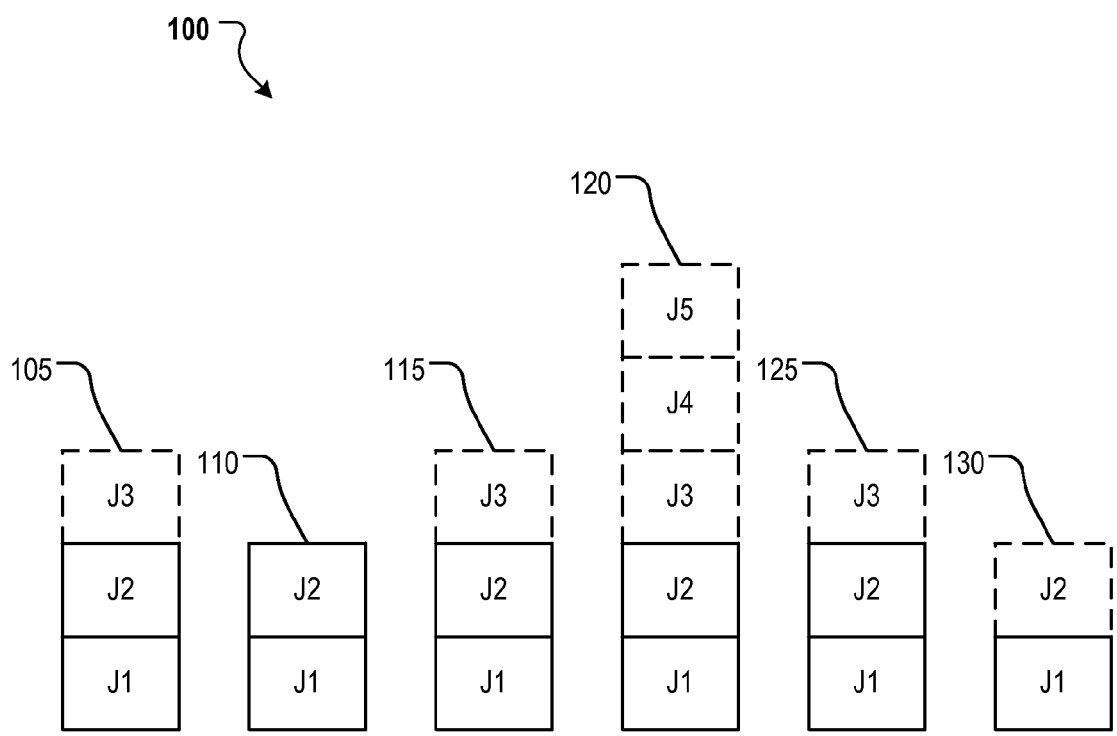
FIG. 1 illustrates a schematic diagram of a prior art data structure for query optimization.
Figure 4:
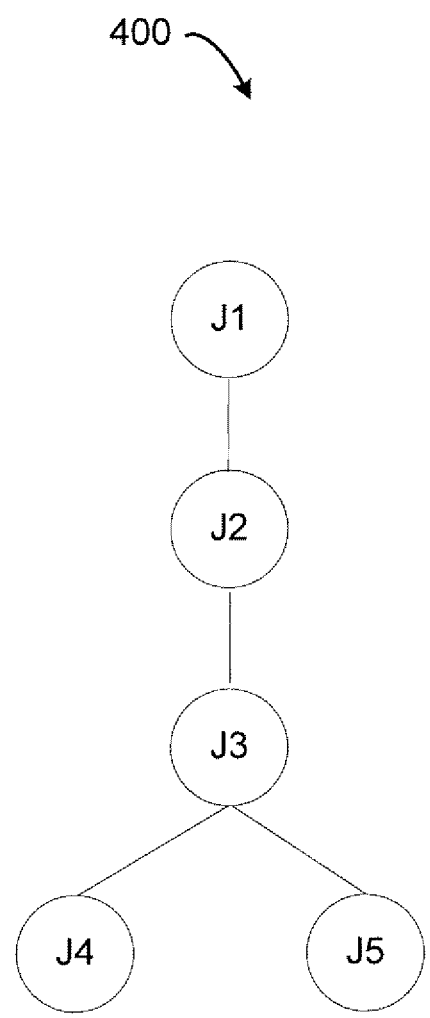
FIG. 4 illustrates an exemplary dependency graph in accordance with an embodiment of the invention.

An exemplary dependency graph in accordance with an embodiment of the invention is illustrated in FIG. 4. Dependency graph 400 illustrates, for example, the five jobs labeled from j1 to j5 as shown in FIG. 1, with a more accurate and graphical depiction of the dependencies between job j3 and jobs j4 and j5. It is appreciated by one of ordinary skill in the art that the use of a graph enables all job dependencies to be explicitly encoded in the graph rather than only with respect to the next job to be executed, as is the case in the stack-based scheduler of the Cascades framework described above.

Figure 5:
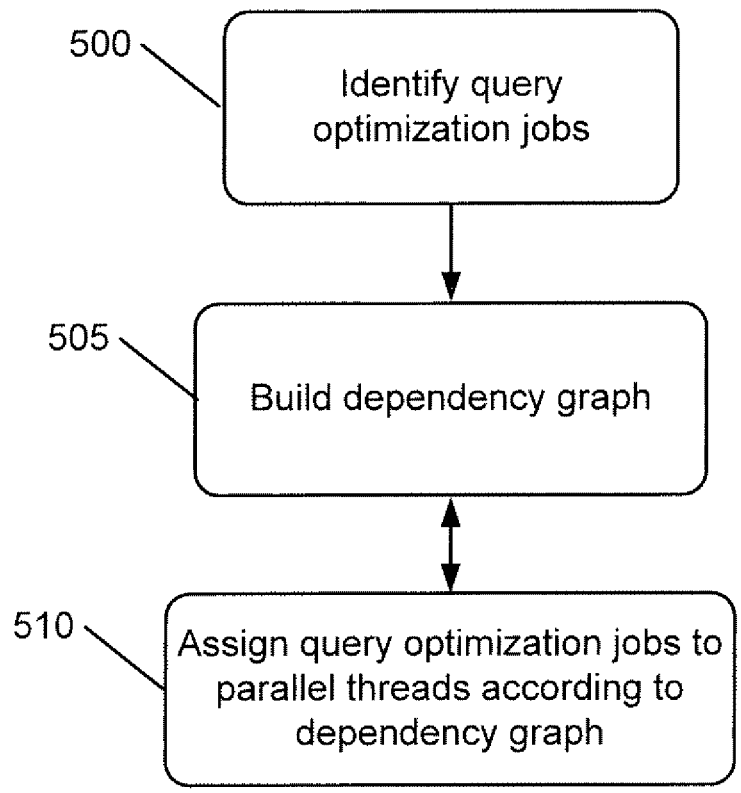
FIG. 5 illustrates a flow chart for parallel processing a query in accordance with an embodiment of the invention.

Referring now to FIG. 5, a flow chart for parallel processing of a query in accordance with an embodiment of the invention is described. First, query optimization jobs are identified in an optimal query plan (500). Next, a dependency graph is generated to encode the dependencies between the jobs in the query plan (505). Lastly, the query optimization jobs are assigned to parallel threads for execution according to the dependencies encoded in the dependency graph (510). In one embodiment, jobs are assigned to parallel threads according to a state machine formed by the Parallel Scheduler 305 in Graph-Based Query Optimizer 225.

It is appreciated that the dependency graph is dynamic as it changes during running time as dependent jobs are identified (this is highlighted by the double arrow between 505 and 510). That is, as jobs are being assigned to parallel threads (510), the dependency graph may be updated (505) to reflect changes in the Jobs that are being executed and their decision to spawn their dependents to parallel threads. Updates are performed to minimize lock contention between multiple parallel threads.

Figure 6:
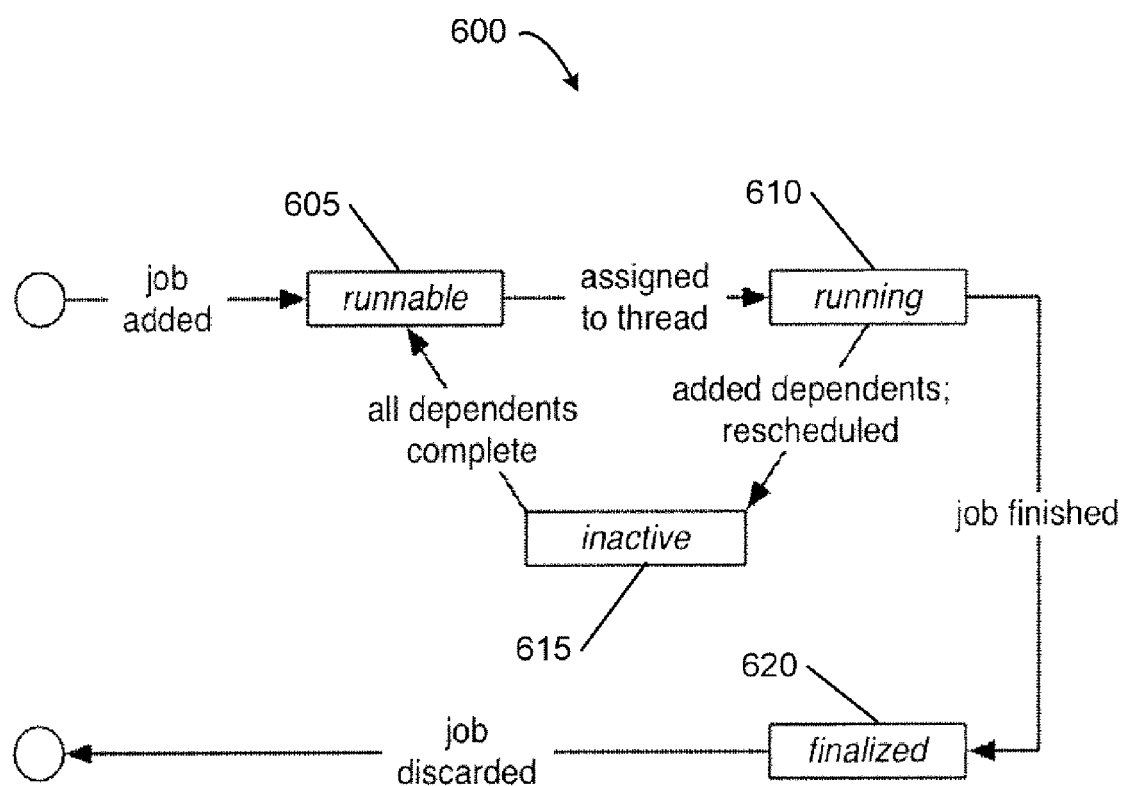
FIG. 6 illustrates a state machine utilized in accordance with an embodiment of the invention.

FIG. 6 illustrates a state machine utilized in accordance with an embodiment of the invention. State machine 600 of Parallel Scheduler 305 assigns jobs to parallel threads according to four states: (1) a runnable state 605 for jobs that are ready to be assigned to a thread; (2) a running state 610 for jobs that are currently being executed and cannot be assigned to another thread; (3) an inactive state 615 for jobs that are waiting for dependent jobs to be completed; and (4) a finalized state 620 for jobs that are complete and can be discarded from the dependency graph.

Figure 7:
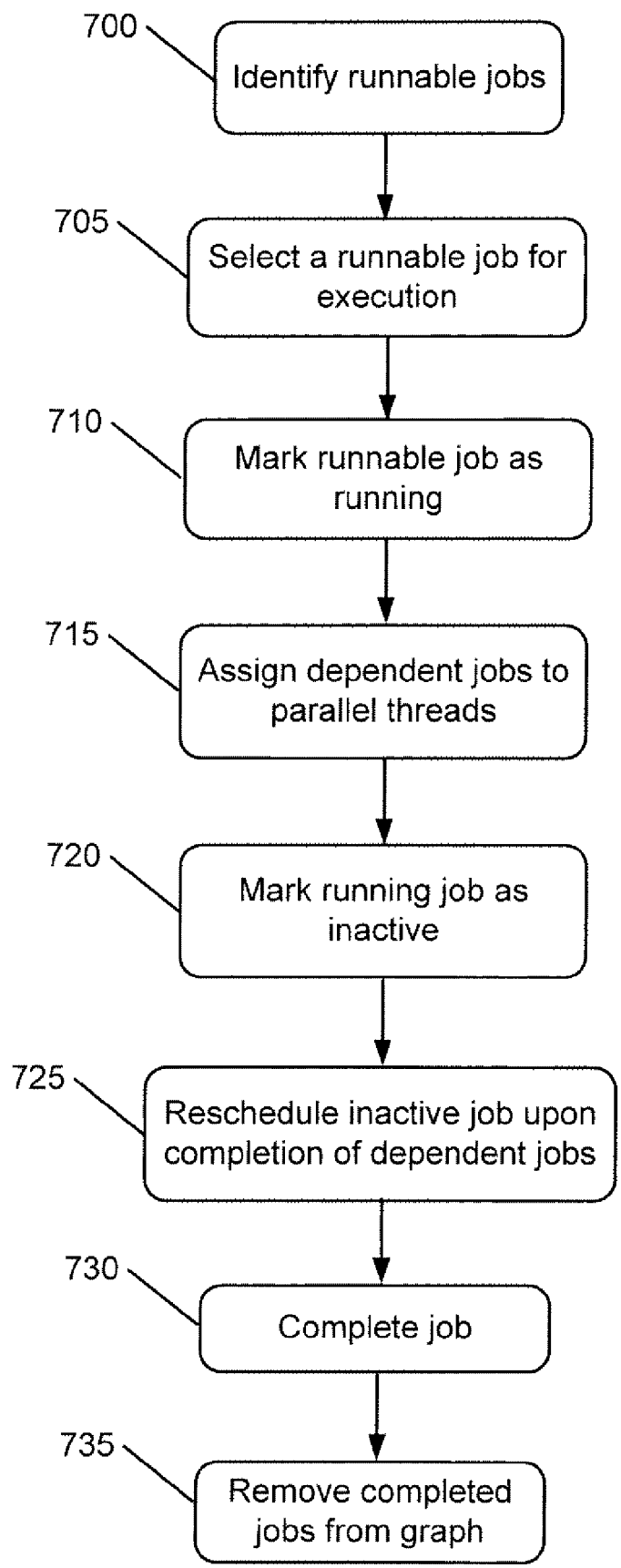
FIG. 7 illustrates a flow chart for assigning a job to a thread according to the state machine illustrated in FIG. 6.

The operation of state machine 600 is described in conjunction with the flow chart illustrated in FIG. 7. First, the jobs in the dependency graph that are ready to be assigned to a thread are identified as runnable (700). Runnable jobs are those in leaf nodes of the dependency graph, i.e., nodes that have no outgoing edges. Next, a runnable job is selected for execution (705). The selected runnable job is assigned to a thread and marked as a running job (710). While running, the selected job decides whether to spawn any dependent jobs. Dependent jobs of the selected, parent job are then assigned to parallel threads and immediately identified as runnable (715).

At this point, the parent Job that spawned its dependents to parallel threads is marked as inactive so it can wait for its dependent jobs to be completed (720). The parent job is rescheduled for execution upon completion of its dependent jobs, when the parent job then becomes runnable and moves on to a running state while executing (725). When complete, the parent job is marked as finalized (730) and removed from the dependency graph (735).

It is appreciated by one of ordinary skill in the art that all operations performed by Parallel Scheduler 305 are atomic, that is, they do not interfere with each other. It is also appreciated that all modifications of Dependency Graph 300 during the optimization process are dealt with in one software procedure. Any job that wants to spawn dependent jobs simply returns them to Parallel Scheduler 305 for their assignment to the parallel threads.

Furthermore, it is also appreciated that the number of threads should be chosen according to the hardware capabilities of the architecture used. The more dependents a job entails, the higher the degree of parallelism that can be exploited. In practice, the number of runnable jobs may be in the one-hundreds at peak and in the tens at least. Any currently available multi-core architecture can be fully utilized with the Parallel Scheduler 305 of the Graph-Based Query Optimizer 225 disclosed herein.

Additionally, it is appreciated that since Parallel Scheduler 305 may be accessed by a potentially large number of concurrent threads, it is important to ensure that runnable jobs can be identified effectively and that lock contention on data structures accessed during the optimization process is kept to a minimum. To do so, in one embodiment the runnable jobs are stored in a linked list by referencing Dependency Graph 300. The choice of a job as the next runnable job can then be made by selecting a random element from the linked list. It is appreciated that customizable strategies may also be used for selecting the next runnable job instead of random selection.

One of ordinary skill in the art also appreciates that the synchronization of concurrent access by parallel threads may be achieved due to the localized operations of adding and removing nodes from the graph. Highly efficient implementations for concurrent data structures are currently available in the literature and may be used to store Dependency Graph 300, including, for example, concurrent skip lists.

Figure 8:
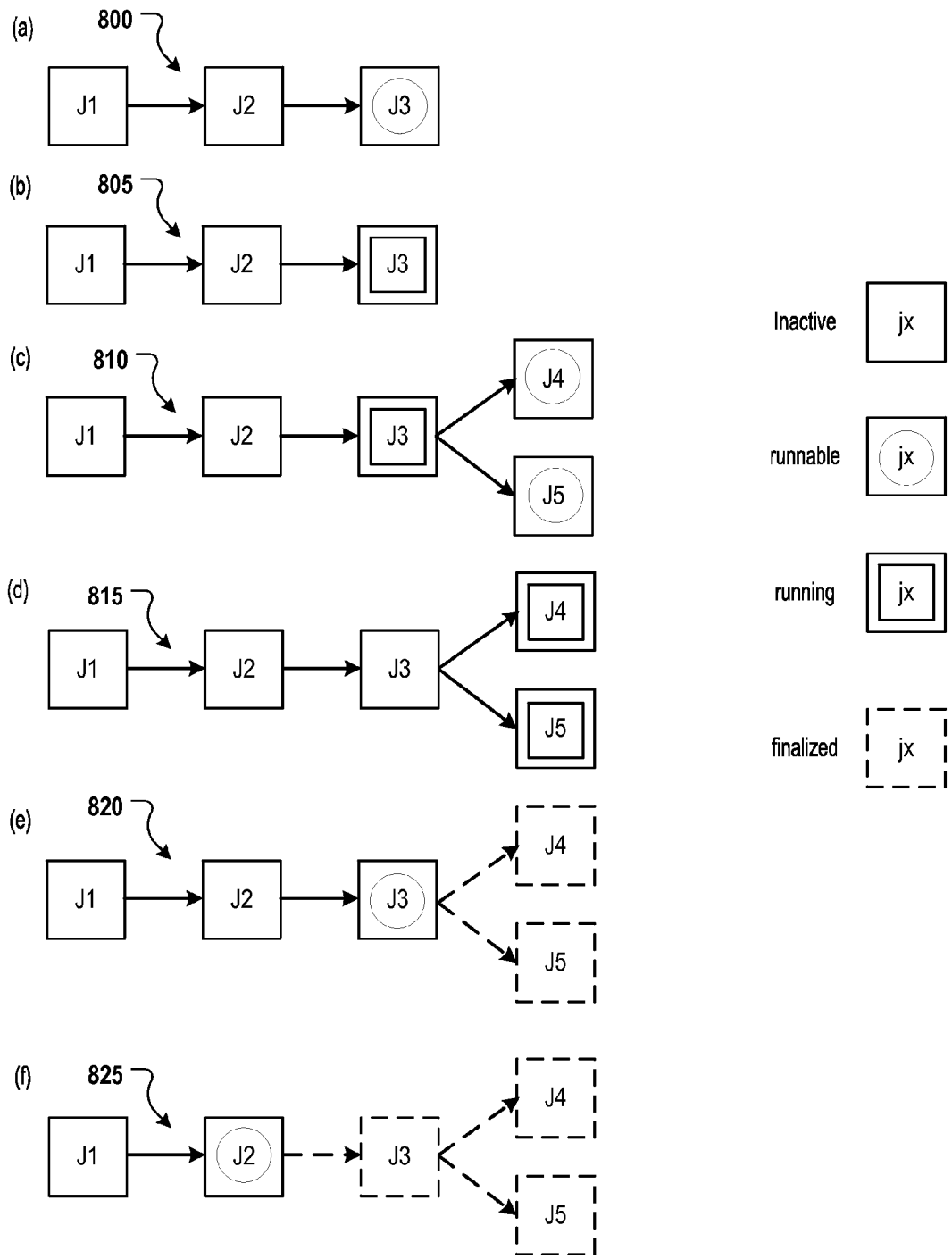
FIG. 8 illustrates a schematic diagram of a dependency graph at different processing stages in accordance with an embodiment of the invention.

Referring now to FIG. 8, a schematic diagram of a dependency graph at different processing stages in accordance with an embodiment of the invention is described. Consider jobs labeled from j1 to j5, as described above with reference to FIG. 4. Leaf nodes in the graph with no outgoing edges can be identified as runnable, such as job j3 shown in dependency graph 800. Unlike the stack-based scheduler used in the prior-art Cascades framework and shown in FIG. 1, jobs such as job j3 are not removed from the dependency graph but are simply made inaccessible to other tasks by designating them as running in graph 805.

Dependent jobs are added to their respective parent and are immediately runnable. For example, dependent jobs j4 and j5 are added to job 3 in graph 810. All runnable jobs are executed in parallel threads. Once a parent job is rescheduled, it is marked as inactive (e.g., job j3 is marked as inactive in graph 815) until all dependents are complete and removed from the graph (e.g., jobs j4 and j5 are removed from graph 820 when finished). After the parent job itself goes back to its running state and completes its execution, it is assigned a finalized state and removed from the graph, as shown in graph 825.

Advantageously, the graph-based query optimizer of the present invention achieves near-linear (i.e., optimal) speed-up. The performance increase depends solely on the number of cores available in the multi-core architecture used. That is, the graph-based query optimizer is completely agnostic to any query optimization specifics, for example, to a particular set of operations or optimization techniques (e.g., join order optimization). The query optimization according to embodiments of the present invention therefore fully utilizes multi-core architectures and is virtually independent of the size of the query.

An embodiment of the present invention relates to a computer storage product with a computer-readable medium having computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs (Compact Disk Read-Only Memories), DVDs (Digital Video Disks or Digital Versatile Disks) and holographic devices; magneto-optical media; and hardware devices that are specially configured to store and execute program code, such as application-specific integrated circuits ("ASICs"), programmable logic devices ("PLDs") and ROM and RAM devices. Examples of computer code include machine code, such as produced by a compiler, and files containing higher-level code that are executed by a computer using an interpreter. For example, an embodiment of the invention may be implemented using Java programming language, C++, or other programming language and development tools. Another embodiment of the invention may be implemented in hard-wired circuitry in place of, or in combination with, machine-executable software instructions.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications; they thereby enable others skilled in the art to best utilize the invention and various embodiments with various modifications as are suited to the particular use contemplated. It is intended that the following claims and their equivalents define the scope of the invention.

What is claimed is:
1. A system, comprising:
a processor; and
a non-transitory computer readable storage medium storing executable instructions operable to cause the processor to perform operations comprising:
representing a parent job of a query plan as a parent node in a dependency graph, the parent job initially being des- ignated in a runnable state indicating that the parent job is ready to be assigned to a thread for execution;

selecting the parent job for execution, wherein, during the execution, the parent job remains being represented by the parent node in the dependency graph, and the parent job is designated as being in a running state indicating that the parent job is inaccessible to other tasks;

spawning, by the parent job in the running state, a dependent job, wherein the parent job can complete execution only after the dependent job completes execution;

adding a first node representing the dependent job to the parent node, the dependent job initially designated as being in a runnable state, the first node to be removed from the dependency graph upon completion of execution of the dependent job; and upon assignment of the dependent job to a thread for execution, designating the dependent job as being in a running state, and designating the parent node as being in an inactive state until the dependent job is completed, the inactive state indicating that the parent job is waiting for the dependent job to complete; wherein the jobs represented in the dependency graph are scheduled, by a parallel scheduler, for execution according to states of the jobs as designated in the dependency graph.

2. The system of claim 1, wherein the graph comprises a data structure accessible by a plurality of parallel threads.

3. The system of claim 1, the operations further comprising designating the parent job as being in the runnable state after the dependent job is completed.

4. The system of claim 1, wherein the parallel scheduler assigns the each dependent job of the parent job to parallel threads using a state machine.

5. The system of claim 4, wherein the state machine comprises a plurality of states associated with each job, the states including the runnable state, the running state, the inactive state, and a finalized state.

6. The system of claim 5, wherein the finalized state of a job indicates that the job is complete and can be discarded from the dependency graph.

7. The system of claim 6, comprising, while the parent job is represented by the parent node in the dependency graph, changing states of the parent job from a runnable state to a running state, then to an inactive state, and then to a runnable state again.

8. The computer readable storage medium of claim 6, wherein the parent node remains in the dependency graph before and during execution of the parent job.

9. The computer readable storage medium of claim 1, wherein the parent job spawns a plurality of dependent jobs, each of the dependent jobs being represented by a respective leaf node in the dependency graph.

10. The computer readable storage medium of claim 9, wherein the dependent jobs are executed by parallel threads, and each of the dependent jobs remains represented by the respective leaf node in the dependency graph when being executed.

11. A non-transitory computer readable storage medium storing executable instructions operable to cause one or more processors to perform operations comprising:

representing a parent job of a query plan as a parent node in a dependency graph, the parent job initially being designated in a runnable state indicating that the parent job is ready to be assigned to a thread for execution;

selecting the parent job for execution, wherein, during the execution, the parent job remains being represented by the parent node in the dependency graph, and the parent job is designated as being in a running state indicating that the parent job is inaccessible to other tasks;

spawning, by the parent job in the running state, a dependent job, wherein the parent job can complete execution only after the dependent job completes execution;

adding a first node representing the dependent job to the parent node, the dependent job initially designated as being in a runnable state, the first node to be removed from the dependency graph upon completion of execution of the dependent job; and upon assignment the dependent job to a thread for execution, designating the dependent job as being in a running state, and designating the parent node as being in an inactive state until the dependent job is completed, the inactive state indicating that the parent job is waiting for the dependent job to complete; wherein the jobs represented in the dependency graph are scheduled, by a parallel scheduler, for execution according to states of the jobs as designated in the dependency graph.

12. The computer readable storage medium of claim 11, wherein the dependency graph comprises a data structure accessible by a plurality of parallel threads.

13. The computer readable storage medium of claim 11, wherein the parallel scheduler assigns the dependent job for execution upon determining that the first node is a leaf node in the dependency graph that has no other dependent jobs thereon.

14. The computer readable storage medium of claim 13, wherein the parallel scheduler is configured to perform actions comprising:

selecting a job from a leaf node in the dependency graph;
assigning the job to a thread for execution;
executing the job; and
dynamically updating the dependency graph to remove finalized jobs and to add newly spawned jobs.

15. The computer readable storage medium of claim 14, wherein the parent job remains in an inactive state until the first job is complete.

16. The computer readable storage medium of claim 15, wherein the parent node remains in the dependency graph before and during execution of the parent job.

17. The computer readable storage medium of claim 11, wherein the parent job spawns a plurality of dependent jobs, each of the dependent jobs being represented by a respective leaf node in the dependency graph, wherein the dependent jobs are executed by parallel threads, and wherein the parallel threads execute in a plurality of cores in a multi-core architecture.

18. A method, comprising:

representing a parent job of a query plan as a parent node in a dependency graph, the parent job initially being designated in a runnable state indicating that the parent job is ready to be assigned to a thread for execution;

selecting the parent job for execution, wherein, during the execution, the parent job remains being represented by the parent node in the dependency graph, and the parent job is designated as being in a running state indicating that the parent job is inaccessible to other tasks;

spawning, by the parent job in the running state, a dependent job, wherein the parent job can complete execution only after the dependent job completes execution;

adding a first node representing the dependent job to the parent node, the dependent job initially designated as being in a runnable state, the first node to be removed from the dependency graph upon completion of execution of the dependent job; and upon assignment of the dependent job to a thread for execution, designating the dependent job as being in a running state, and designating the parent node as being in an inactive state until the dependent job is completed, the inactive state indicating that the parent job is waiting for the dependent job to complete; wherein the jobs represented in the dependency graph are scheduled, by a parallel scheduler, for execution according to states of the jobs as designated in the dependency graph.

19. The method of claim 18, wherein the parent job spawns a plurality of dependent jobs, each of the dependent jobs being represented by a respective leaf node in the dependency graph, and the dependent jobs are executed by parallel threads, and each of the dependent jobs remains represented by the respective leaf node in the dependency graph when being executed.

\* \* \* \* \*

UNITED STATES PATENT AND TRADEMARK OFFICE
CERTIFICATE OF CORRECTION

PATENT NO. : 9,218,209 B2
APPLICATION NO. : 12/347728
DATED : December 22, 2015
INVENTOR(S) : Florian Michael Waas Page 1 of 1

It is certified that error appears in the above-identified patent and that said Letters Patent is hereby corrected as shown below:

On Title Page 1, item (56), Column 2 (Publication), line 1: Delete "PVLDP '08" and insert -- PVLDB '08, --, therefor.

Signed and Sealed this
Sixteenth Day of August, 2016

Michelle K. Lee
*Director of the United States Patent and Trademark Office*